United States Patent
Spencer et al.

(10) Patent No.: US 10,100,807 B2
(45) Date of Patent: Oct. 16, 2018

(54) BALSAWOOD CORES FOR COMPOSITE MATERIAL SANDWICH PANELS AND METHOD OF THEIR MANUFACTURE

(71) Applicant: Gurit (UK) Ltd, Hampshire (GB)

(72) Inventors: Paul Spencer, Southampton (GB); Maggy Manguian, Newport (GB)

(73) Assignee: Gurit (UK) Ltd., Newport, Isle of Wight, Hampshire (GB)

( * ) Notice: Subject to any disclaimer, the term of this patent is extended or adjusted under 35 U.S.C. 154(b) by 259 days.

(21) Appl. No.: 14/773,890

(22) PCT Filed: Mar. 10, 2014

(86) PCT No.: PCT/EP2014/054519
§ 371 (c)(1),
(2) Date: Sep. 9, 2015

(87) PCT Pub. No.: WO2014/139908
PCT Pub. Date: Sep. 18, 2014

(65) Prior Publication Data
US 2016/0017863 A1    Jan. 21, 2016

(30) Foreign Application Priority Data

Mar. 11, 2013 (GB) .................................. 1304307.0

(51) Int. Cl.
| *F03D 1/06* | (2006.01) |
| *B29C 70/08* | (2006.01) |
| *E04C 2/24* | (2006.01) |
| *B05D 1/28* | (2006.01) |
| *B05D 3/02* | (2006.01) |
| *B05D 3/06* | (2006.01) |
| *B05D 7/08* | (2006.01) |
| *B29K 311/14* | (2006.01) |

(52) U.S. Cl.
CPC .............. *F03D 1/0675* (2013.01); *B05D 1/28* (2013.01); *B05D 3/0254* (2013.01); *B05D 3/067* (2013.01); *B05D 3/068* (2013.01); *B05D 7/08* (2013.01); *B29C 70/088* (2013.01); *E04C 2/24* (2013.01); *B29K 2311/14* (2013.01); *Y02E 10/721* (2013.01)

(58) Field of Classification Search
CPC ....... F03D 1/0675; B05D 1/28; B05D 3/0254; B05D 3/067; B05D 3/068; B05D 7/08; B29C 70/088; E04C 2/24; B29K 2311/14; Y02E 10/721
USPC ....................................................... 428/537.1
See application file for complete search history.

(56) References Cited

U.S. PATENT DOCUMENTS 3,616,112 A * 10/1971 Desai ........................ E04C 2/24
114/348

OTHER PUBLICATIONS

Int'l. Search Report dated Jun. 13, 2014 in Int'l. Application No. PCT/EP2014/054519.

* cited by examiner

*Primary Examiner* — Leszek B Kiliman
(74) *Attorney, Agent, or Firm* — Polsinelli, PC

(57) ABSTRACT

A method of manufacturing a core for a composite material sandwich panel, the method comprising the steps of: providing a sheet of balsawood with opposite major surfaces, with vessels and axial parenchyma cells of the balsawood extending between the opposite major surfaces in a thickness direction of the sheet; coating a layer of a curable resin composition onto respective opposite major surfaces of the sheet of balsawood; and curing the curable resin composition, wherein the resin composition is applied and cured so that the coating layer of cured resin composition unevenly fills or only partly fills outermost ends of at least some of the vessels in the balsawood and thereby provides, at least in the vicinity of at least some of the vessels, a non-planar outer surface of the coating layer of the cured resin composition over the opposite major surfaces.

40 Claims, 1 Drawing Sheet

BALSAWOOD CORES FOR COMPOSITE MATERIAL SANDWICH PANELS AND METHOD OF THEIR MANUFACTURE

FIELD OF THE INVENTION

The present invention relates to a method of manufacturing a balsawood core for a composite material sandwich panel, in particular a balsawood core of a sandwich panel comprising outer layers of a fibre reinforced matrix resin composite material. The present invention also relates to a balsawood core of a sandwich panel comprising outer layers of a fibre reinforced matrix resin composite material.

BACKGROUND OF THE INVENTION

It is well known in the art of structural composite materials to employ balsawood as the material of a core of a sandwich panel comprising outer layers of a fibre reinforced matrix resin composite material. The sandwich panel is typically manufactured by disposing respective fibre layers on opposite surfaces of the balsawood and then infusing a curable resin into the fibre layers and against the opposite surfaces during a vacuum assisted resin transfer moulding step. The resin is then cured to form the sandwich panel.

There is a need to provide a strong adhesive bond between the cured resin layers and the core, so that there is a high peel strength between the cured resin and the core.

There is also a need to minimise the resin take-up of the core. This adds undesired weight to the sandwich panel. The opposite surfaces of the balsawood core tend to have a propensity to take-up the curable resin by absorption of the resin into the opposite surfaces, when the resin is infused against the surfaces during a vacuum assisted resin transfer moulding step.

Balsawood is a natural material and so has a structure and properties which are not particularly uniform. In order to provide a core having high shear strength, the balsawood is cut into sheets, with the major planar cut surfaces of the sheets being substantially transverse to the height direction of the balsawood tree. Therefore the cut surfaces expose the ends of vessels, typically 0.2 to 0.4 mm in diameter, which are acicular cells which form the major part of the Balsa tree water transport system. In a cut sheet for manufacturing a core, the vessel portions extend between the major planar cut surfaces of the sheet. Axial parenchyma cells, typically 0.02 to 0.04 mm in diameter, and fibres also extend between the major planar cut surfaces of the sheet. Radial parenchyma cells extend substantially in or parallel to the major planar cut surfaces of the sheet.

The outer core surfaces are required to form a strong bond, exhibiting high peel strength, with the resin of the fibre reinforced matrix resin layer laminated to the core. The provision of the transverse cut surfaces of the balsawood exposing the vessels and axial parenchyma cells can assist the formation of a high peel strength bond between the resin matrix and the core.

However, such transverse surfaces, by exposing the ends of the vessels and the ends of the axial parenchyma cells, tend to absorb a large amount of resin which is infused into the fibrous reinforcement material during the vacuum assisted resin transfer moulding step. The absorbed resin in the core adds significant weight to the sandwich panel, without increasing the mechanical properties of the sandwich panel, which is undesirable. Also, the absorption of resin into the balsawood core increases raw material costs during manufacturing.

It is known to coat the balsawood surfaces with a thick polymer layer, prior to the vacuum assisted resin transfer moulding step. Usually a liquid thermoset resin such as epoxy resin is used with a thixotropic additive to thicken the mix. This is manually screeded over the balsawood surface and allowed to cure to pre-treat the surface prior to resin infusion. The thixotropic agent helps to prevent the tendency for the liquid resin to fill the cells while waiting for the resin to thicken and cure. The thixotropic mixture has relatively high viscosity and results in a thick and heavy coating, usually in excess of 400 g/m$^2$ on each face of the balsawood. There is a combined weight saving compared to infusing the balsawood without any coating as the coating blocks the majority of the cells after cure. However, this process adds substantial time and cost to the manufacturing process and still results in a high resin absorption.

It was also known to apply solvent based coatings to coat the surface to leave a thinner barrier coating. However, this type of layer has been found significantly to reduce the peel strength of the resin layer on the balsawood core surfaces. The combined result is that this known coating does not provide the combination of high mechanical properties, including high peel strength, and low resin uptake required by balsawood cores for use in sandwich panels.

Furthermore, when applying polymeric resin coatings to balsawood the curing and/or drying time of the coatings can be rather long, for example to enable solvents to evaporate fully from the coating, which makes the manufacturing process inefficient.

In combination, there is a need for sandwich panels incorporating a balsawood core to exhibit a combination of high mechanical properties, including high peel strength, and low resin uptake, and which is efficient, easy and inexpensive to manufacture.

SUMMARY OF THE INVENTION

The present invention aims to meet that need. The present invention aims to provide a method for manufacturing a balsawood core for use in a sandwich panel which exhibits low resin take-up by the balsawood surfaces, while providing high mechanical properties of the core and a high peel strength between the surface of the core and resin of a fibre reinforced matrix resin composite material bonded thereto by adhesion between the resin and the core surface, and which is efficient, easy and inexpensive to manufacture.

Accordingly, the present invention provides a method of manufacturing a core for a composite material sandwich panel, the method comprising the steps of:
(a) providing a sheet of balsawood with opposite major surfaces, with vessels and axial parenchyma cells of the balsawood extending between the opposite major surfaces in a thickness direction of the sheet;
(b) coating a layer of a curable resin composition onto respective opposite major surfaces of the sheet of balsawood; and
(c) curing the curable resin composition by radiation,
wherein the curable resin composition applied in step (b) has a viscosity of from 1 to 50 Poise when applied to the balsawood surfaces and a coating weight for each coated balsawood surface of from 50 to 300 g/m$^2$.

In this specification, the rheology measurements, for example to measure the viscosity of the curable resin composition, were carried out using a TA Instruments AR2000 rheometer with a 20 mm diameter steel plate. The experiments were carried out with in flow mode with a controlled shear stress (32.59 dyne/cm²) and gap of 1000 µm. The temperature was increased from 10 C to 60° C. at 2° C./min ramp rate.

The present invention further provides a method of manufacturing a core for a composite material sandwich panel, the method comprising the steps of:

(a) providing a sheet of balsawood with opposite major surfaces, with vessels and axial parenchyma cells of the balsawood extending between the opposite major surfaces in a thickness direction of the sheet;

(b) coating a layer of a curable resin composition onto respective opposite major surfaces of the sheet of balsawood; and (c) curing the curable resin composition by radiation to restrict the penetration by uncured resin into the balsawood vessels, wherein the resin composition is applied and cured so that the coating layer of cured resin composition unevenly fills or only partly fills outermost ends of at least some of the vessels in the balsawood and thereby provides, at least in the vicinity of at least some of the vessels, a non-planar outer surface of the coating layer of the cured resin composition over the opposite major surfaces.

Typically, the curing is effected by ultraviolet radiation, electron beam radiation or thermal radiation or other electromagnetic radiation.

In some embodiments, the coating layer of cured resin composition, apart from at the outermost ends of the vessels in the balsawood at which the surface includes a cavity or depression above the vessel, is substantially continuous and planar.

In some embodiments, the curable resin composition applied in step (b) has a viscosity of from 1 to 50 Poise, optionally from 2 to 20 Poise, further optionally from 2 to 8 Poise, when applied to the balsawood surfaces. In some embodiments, the curable resin composition applied in step (b) has a coating weight for each coated balsawood surface of from 50 to 300 g/m², optionally from 75 to 160 g/m², further optionally from 90 to 120 g/m².

In some embodiments, the curable resin composition applied in step (b) forms a coating layer having an average thickness of from 20 to 600 microns, optionally from 40 to 400 microns.

In some embodiments, the curable resin composition applied in step (b) comprises at least one polymerisable monomer and a curing agent for polymerising the at least one polymerisable monomer. When the curing is by photoradiation, e.g. ultraviolet radiation, the curing agent comprises a photoinitiator initiated by the radiation.

In some embodiments, the curable resin composition applied in step (b) comprises at least one acrylate or methacrylate monomer. Preferably, the curable resin composition applied in step (b) further comprises at least one urethane acrylate monomer.

In some embodiments, the curable resin composition applied in step (b) is solvent-free or comprises no more than 1 wt %, based on the weight of the curable resin composition, of a non-polymerisable solvent for any polymerizable monomers present in the curable resin composition. In some embodiments, the curable resin composition applied in step (b) is substantially free of particulate fillers.

In some embodiments, the curable resin composition applied in step (b) is heated above the ambient temperature to give an application viscosity of 1 to 50 Poise, optionally from 2 to 20 Poise, further optionally from 2 to 8 Poise, when applied to the balsawood surface.

In some embodiments, the resin composition is applied and cured so that the cured resin composition extends downwardly into vessels of the balsawood to an average depth of from 250 to 2500 microns, optionally from 500 to 1500 microns, further optionally from 750 to 1250 microns.

In some embodiments, the coating step (b) is carried out using a roller.

In some embodiments, the curing step (c) is carried out on a given area of the coating layer within a period of from 2 to 45 seconds, optionally from 5 to 30 seconds, optionally from 5 to 25 seconds, further optionally from 10 to 20 seconds, after coating of that area in step (b).

In some embodiments, the coating step (b) and the curing step (c) are carried out by the step of (d) transporting the sheet successively through a coating station and a radiation curing station at a velocity of from 1 to 30 meters/minute, optionally from 5 to 20 meters/minute.

The method may optionally further comprise the step (e) of adjusting the velocity of the sheet transported successively through the coating station and the radiation curing station, and/or a distance between the coating station and the radiation curing station, in response to comparison of a measured penetration depth against a target penetration depth of the resin composition into a major surface of the sheet of balsawood.

The present invention further provides a core for a composite material sandwich panel, the core comprising a coated balsawood sheet produced by the method of the invention.

The present invention further provides a composite material sandwich panel comprising a core according to the invention sandwiched between opposed outer layers of fibre reinforced matrix resin material.

Optionally, the outer layers of fibre reinforced matrix resin material comprise at least one of glass fibres and carbon fibres and a cured thermoset resin matrix, the cured thermoset resin being bonded to the coating layer. The thermoset resin is preferably a polyester, vinyl ester, or an epoxy resin.

Optionally, the cured thermoset resin has a climbing drum peel strength to the coated balsawood core of from 225 to 450 N/75 mm measured according to BS5350 Part C13.

The present invention further provides a composite material sandwich panel comprising opposed outer layers of fibre reinforced matrix resin material and a balsawood core sandwiched between the opposed outer layers, each outer layer of fibre reinforced matrix resin material comprising at least one of glass fibres and carbon fibres and a cured thermoset resin matrix, the balsawood core being coated with coating layer and the cured thermoset resin being bonded to the coating layer, wherein the cured thermoset resin has a climbing drum peel strength to the coated balsawood core of from 225 to 450 N/75 mm measured according to BS5350 Part C13.

The present invention further provides a structural element incorporating the composite material sandwich panel of the invention. The present invention further provides a wind turbine blade, or a marine component or craft, incorporating a structural element according to the invention.

BRIEF DESCRIPTION OF THE DRAWINGS

Embodiments of the present invention will now be described by way of example only, with reference to the accompanying drawings, in which.

DETAILED DESCRIPTION

The present invention provides a method of manufacturing a core for a composite material sandwich panel.

Figure 1:
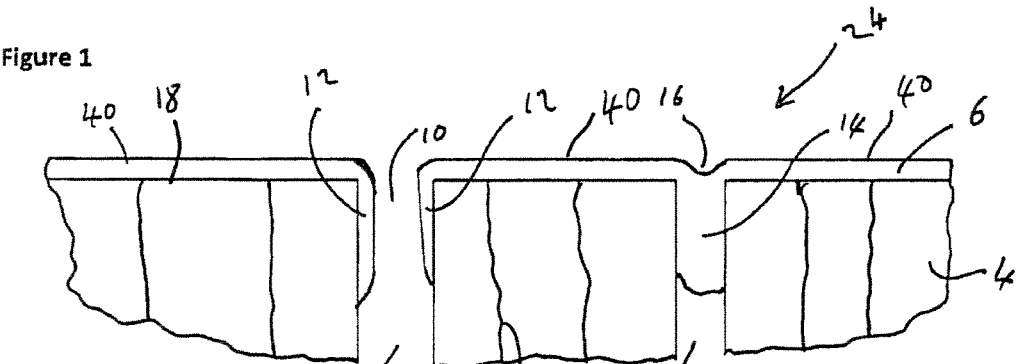
FIG. 1 schematically illustrates an enlarged sectional view of a surface of balsawood sheet coated with a curable resin composition produced during a core manufacturing method in accordance with an embodiment of the invention.
Figure 2:
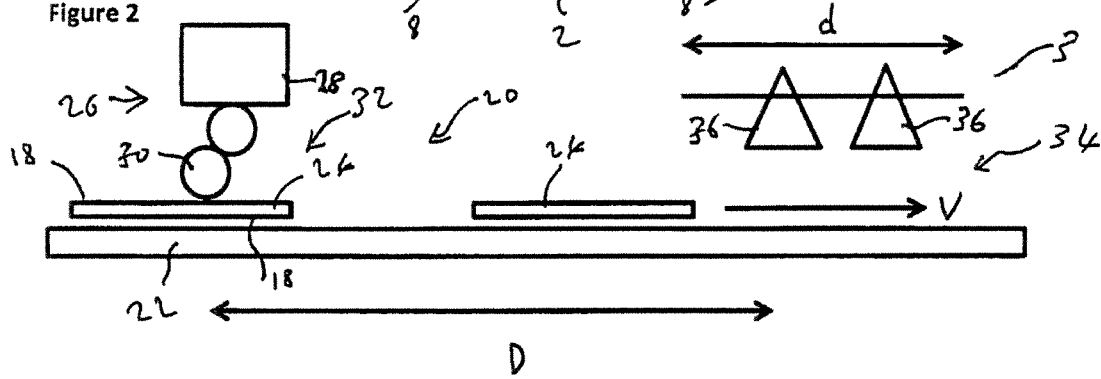
FIG. 2 schematically illustrates a side view of a resin coating step for coating a balsawood sheet with a curable resin composition produced during a core manufacturing method in accordance with an embodiment of the invention.

Referring to FIGS. 1 and 2, in the method of the invention a sheet of balsawood, generally designated as 24 has opposite major surfaces 18. One surface 18 is shown in FIG. 1, in which some dimensions are exaggerated for the purpose of clarity of illustration. Vessels 8 and axial parenchyma cells 2 of the balsawood 24 extend between the opposite major surfaces 18 in a thickness direction of the sheet 2.

A layer 6 of a curable resin composition is coated onto the respective opposite major surfaces 18 of the sheet 24 of balsawood. Both layers 6 may be coated simultaneously or alternatively, as shown in FIG. 2, each layer 6 may be individually applied. The coating and curing apparatus 20 of FIG. 2 is configured for the embodiments which applies only one surface coating layer at a time to each sheet 24.

The curable resin composition of the preferred embodiments comprises at least one polymerisable unsaturated monomer, preferably at least one acrylate or methacrylate monomer and, as an elastomer, at least one urethane acrylate monomer, and a curing agent for polymerising the at least one polymerisable monomer However, other curable resin compositions may be employed. The curable resin composition preferably includes an elastomer component so that the cured resin layer has flexibility and does not tend to crack or de-adhere from the core or the laminate resin when the resultant sandwich panel is subjected to bending stresses.

The curing may be carried out by thermal radiation heat, ultraviolet radiation or electron beam radiation, or any other suitable electromagnetic radiation which can rapidly cure the resin composition. Preferably, ultraviolet radiation is used, in which case the the curing agent comprises a photoinitiator initiated by ultraviolet radiation.

The invention provides a high level of control of the curing of the resin, so that resin penetration into the balsawood is controlled and minimised, thereby minimising resin take-up into the balsawood. The curing is therefore rapidly effected after coating of the resin, to minimise the time period during which the uncured resin can flow into the vessels, and rapidly substantially fully cures the entire resin coating, so as to ensure that there is substantially no further resin penetration after the rapid cure.

Typically, the resin of the coating layer is entirely cured within a period of from 2 to 45 seconds, optionally from 5 to 30 seconds, further optionally from 5 to 25 seconds, further optionally from 10 to 20 seconds, after being coated onto the balsawood.

Preferably, the curable resin composition is solvent-free or comprises no more than 1 wt %, based on the weight of the curable resin composition, of a non-polymerisable solvent for any polymerizable monomers present in the curable resin composition. This ensures that the resin can be fully cured rapidly by e.g. UV radiation and immediately form a dry, tack-free cured coating. The composition may include a component, such as an amine-functional molecule to improve surface curing and prevent tack. The UV curing may also be conducted in an oxygen-deficient atmosphere, such as under a nitrogen blanket, to enhance complete curing and reduce tack. Preferably, the curable resin composition is substantially free of particulate fillers. This ensures that the resin, prior to UV curing, has the desired viscosity and can freely flow.

As shown in FIG. 2, a coating apparatus 26 is provided which includes a roller 30 which coats the curable resin composition stored in a hopper tank 28. Other coating devices and techniques may be employed. Typically, the curable resin composition applied at the coating station 32 is at a temperature of from 20 to 40° C., although higher or lower temperatures may be employed.

A conveyor 22 transports balsawood sheets 24 successively through the coating station 32 and then through an ultraviolet radiation (UV) curing station 34 which includes UV lamps 36. When alternative radiation other than UV is used for curing, the required other radiation sources are provided at the curing station. At the curing station 34 the curable resin composition is cured by e.g. ultraviolet radiation. The conveyor 22 typically transports the sheets 24 at a velocity V of from 1 to 30 meters/minute, for example from 5 to 20 meters/minute.

The curable resin composition 6 typically has a viscosity of from 1 to 50 Poise when applied to the balsawood surfaces 18 and a coating weight for each coated balsawood surface 18 of from 50 to 300 g/m$^2$.

In some preferred embodiments, the curable resin composition 6 has a viscosity of from 2 to 20 Poise, optionally from 2 to 8 Poise, when applied to the balsawood surfaces 18. In some preferred embodiments, the curable resin composition 6 has a coating weight for each coated balsawood surface 18 of from 75 to 160 g/m$^2$, optionally from 90 to 120 g/m$^2$.

In some preferred embodiments, the curable resin composition forms a coating layer 6 having an average thickness of from 20 to 600 microns, optionally from 40 to 400 microns.

The curing step is carried out at the curing station 34 on a given area of the coating layer within a period of from 2 to 45 seconds, optionally from 5 to 25 seconds, further optionally from 10 to 20 seconds, after coating of that area at the coating station 32. The time period may be adjusted by modifying the distance D between the curing station 34 and the coating station 32, for example by sliding the UV lamps 36 about a distance d in the transport direction.

In the preferred embodiments of the invention, as shown schematically in FIG. 1, the curable resin composition is applied and cured so that the coating layer 6 of cured resin composition only partly fills outermost ends of at least some of the vessels 8 in the balsawood thereby forming a cavity 10 in the coating layer 6. Additionally or alternatively, some vessels 8 may be fully but unevenly filled and so form a depression 16 in the coating layer 6 in the vicinity of the vessels 8. This coating morphology provides, at least in the vicinity of at least some of the vessels 8, a non-planar outer surface of the coating layer 6 of the cured resin composition over the opposite major surfaces 18 of the resultant balsawood core. The coating layer 6 of cured resin composition, apart from at the outermost ends of the vessels 8 in the balsawood at which the surface includes a cavity 10 or depression 16 above the vessel 6, has a substantially continuous and planar surface 40.

In some embodiments, the resin composition is applied and cured so that the cured resin composition extends downwardly into vessels 8 of the balsawood to an average depth of from 250 to 2500 microns, optionally from 500 to 1500 microns, further optionally from 750 to 1250 microns.

The velocity V of the balsawood sheet 24 transported successively through the coating station 32 and the ultraviolet radiation curing station 34, and/or a distance between the coating station 32 and the ultraviolet radiation curing station 34, may be adjusted in response to comparison of a measured penetration depth of resin into the balsawood against a target penetration depth of the resin composition into a major surface of the sheet 24 of balsawood. The penetration depth may be determined by staining the resin with a dye and microscopic examination of cross-sections of the coated balsawood sheets 24.

Figure 3:
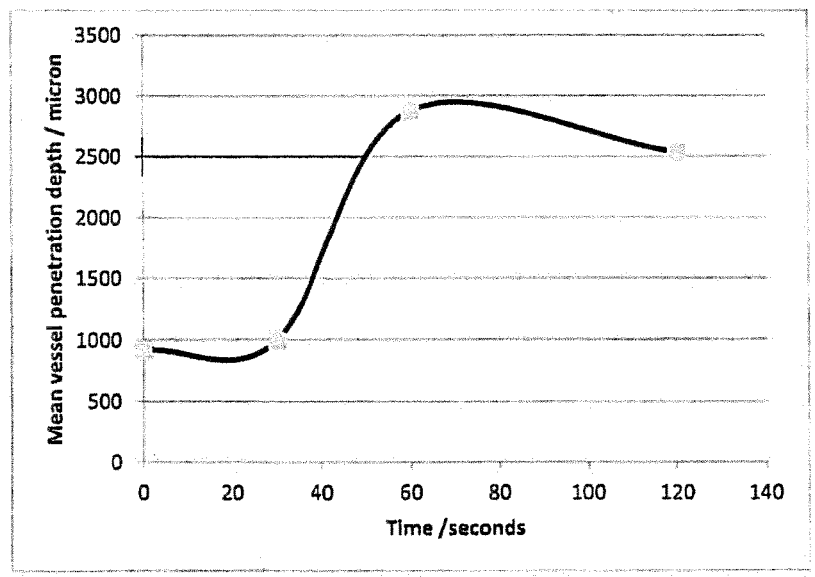
FIG. 3 is a graph showing the relationship between balsawood vessel penetration and elapsed time between coating and curing of the curable resin composition during a core manufacturing method in accordance with an embodiment of the invention.

Referring to FIG. 3, for one embodiment of a curable resin composition, the mean vessel penetration depth was measured for various elapsed time periods after applying the coating to an area of a sample balsawood sheet 24 (the time is zero at the coating station). It may be seen that the mean penetration depth was substantially constant, at a value of about 1000 microns, over an initial period of about 30 seconds, and then rapidly increased.

This result shows that, at least for this sample of balsawood, controlling the elapsed time between coating and curing of the resin composition significantly controls resin penetration, because curing causes the rein to solidify to prevent further resin fluid flow into the vessels.

By rapidly UV curing of the resin after a selected elapsed time after coating, the penetration depth can be minimised, and any excessive resin take-up into the vessels can also be minimised.

The curable resin including acrylate and/or methacrylate monomers, optionally with elastomeric urethane acrylate monomers, comprises unsaturated monomer groups in the presence of a UV initiator which substantially immediately polymerise after UV initiation. The vessel penetration depth is controlled, but in combination with the required coating being provided on the major portion of the balsawood surface to avoid or minimise resin-take-up in surface regions apart from the vessels.

For the example of FIG. 3, if the coated area of the balsawood sheet was passed under the curing station after a period of no more than 30 seconds from coating application, the penetration depth would be minimised at less than about 1000 microns by curing the resin before any substantial amount of resin could flow to a greater vessel depth.

The resultant coated balsawood sheet may be utilised as a core for a composite material sandwich panel, the core comprising a coated balsawood sheet produced by the method of the invention, and the sandwich panel comprising the core sandwiched between opposed outer layers of fibre reinforced matrix resin material. Typically, the outer layers of fibre reinforced matrix resin material comprise at least one of glass fibres and carbon fibres and a cured thermoset, e.g. epoxy, resin matrix, the cured thermoset resin being bonded to the coating layer. Other resins could be employed, such as vinyl ester resins, which are known for use in manufacturing sandwich panels. Preferably, the cured resin has a climbing drum peel strength to the coated balsawood core of from 225 to 450 N/75 mm measured according to BS5350 Part C13.

The sandwich panel may be utilised as a structural element incorporating the composite material sandwich panel of the invention. A structural member such as a wind turbine blade, a marine component, or a marine craft, may incorporate the structural element.

Further aspects of the invention are described with reference to the following non-limiting Example.

Example 1

In Example 1, a balsawood sheet having a mean density of about 155 kg/m$^3$ was coated with a curable resin composition comprising a difunctional methacrylate resin blended with a difunctional methacrylate diluent, and comprising a urethane acrylate as a flexibiliser. The composition included a UV photoinitiator. An amine-functional monomer was also included to improve surface curing and prevent tack. The curable resin composition had a viscosity of about 20 Poise at a temperature of 20° C., about 10 Poise at a temperature of 30° C., and about 6 Poise at a temperature of 40° C.

The curable resin composition was coated onto each major surface of a balsawood sheet. The coating weight per surface was 107 g/m$^2$. This provided a coating weight per panel of 214 g/m$^2$ of panel. Curing by UV radiation was carried out 15 seconds after coating.

The resultant coated balsawood core was tested to determine the resin take-up by the coated balsawood core. The resin take-up was measured by simulating a vacuum assisted resin transfer moulding process employing an epoxy resin with the resin being infused against the opposite coated balsawood core surfaces. The weight of the resin absorbed by the core was measured and calculated to provide a resin weight per unit area of the panel, i.e. the resin taken up by both surfaces of the panel. The results are shown in Table 1.

The resultant coated balsawood core was also tested to determine the climbing drum peel strength to the coated balsawood core, which was measured to give a value in units of N/75 mm according to BS5350 Part C13. The results are also shown in Table 1.

TABLE 1

|  | Panel resin take-up kg/m$^2$ | Panel total weight take-up kg/m$^2$ | Average peel strength N |
|---|---|---|---|
| Example 1 | ~1175 | ~1375 | ~240 |
| Comparative Example 1 | ~2200 | ~2200 | ~300 |
| Comparative Example 2 | ~1950 | ~2000 | ~225 |

In Example 1 the total weight take-up for the panel included the coating weight and the resin take-up for the panel.

Example 1 showed a low level of resin take-up and acceptable peel strength for the sandwich panel.

Comparative Example 1

Comparative Example 1 employed the same balsawood but this was uncoated. The uncoated balsawood of Comparative Example 1 was subjected to the same resin infusion procedure as for the coated balsawood of Example 1. The uncoated balsawood core was subjected to the same resin take-up test and peel strength test as the coated balsawood core or Example 1. In the resin take-up test the total weight take-up for the panel was the same as the resin take-up for the panel because there was no coating weight for the uncoated panel.

A comparison of the results of Example 1 and Comparative Example 1 shows that applying the coating in accordance with the invention significantly reduced both the total weight take-up for the panel and the resin take-up for the panel. Furthermore, the coating did not significantly reduce the peel strength below an acceptable level required for a core for an epoxy resin laminated sandwich panel. The peel strength value for Example 1 at about 240N was an acceptable level.

Comparative Example 2

Comparative Example 2 employed the same balsawood as Example 1 but this was coated with a different coating.

In Comparative Example 2 the balsawood sheet was coated with a curable resin composition comprising a polyester primer resin curable by UV radiation and sold under the trade name UVEFOND MR 7708 by Industrias Omar, Valencia, Spain. This is a commercially available UV curable polyester resin known for use in sealing surfaces such as balsawood surfaces. This composition comprises unsaturated polyester resin, monomers, inorganic fillers and photoinitiators for UV curing and drying. The coating was applied at the manufacturer's recommended coating weight of 15-30 g/m$^2$ by roller application. The viscosity was about 17 Poise at a temperature of 20° C., about 8 Poise at a temperature of 30° C., and about 4 Poise at a temperature of 40° C.

As compared to Example 1, for Comparative Example 2 the resin coating weight was lower and the resin viscosity was lower.

The curable resin composition was coated onto each major surface of the balsawood sheet. Curing by UV radiation was carried out about 15 seconds after coating.

The differently coated balsawood of Comparative Example 2 was subjected to the same resin infusion procedure as for the coated balsawood of Example 1. The uncoated balsawood core was subjected to the same resin take-up test and peel strength test as the coated balsawood core or Example 1. In the resin take-up test the total weight take-up for the panel was the same as the resin take-up for the panel because there was no coating weight for the uncoated panel.

A comparison of the results of Example 1 and Comparative Example 2 shows that applying the coating in accordance with the invention provided significantly reduced both total weight take-up for the panel and resin take-up for the panel as compared to using the low viscosity/low coating weight polyester resin. Furthermore, the coating in accordance with the invention provided a higher peel strength as compared to using the low viscosity/low coating weight polyester resin.

These results show that the coating in accordance with the invention provided improved resin take-up reduction and improved resin peel strength as compared to a known UV curable polyester resin known for use in sealing surfaces such as balsawood surfaces.

The invention claimed is:

1. A method of manufacturing a core for a composite material sandwich panel, the method comprising the steps of:
    (a) providing a sheet of balsawood with opposite major surfaces, with vessels and axial parenchyma cells of the balsawood extending between the opposite major surfaces in a thickness direction of the sheet;
    (b) coating a layer of a curable resin composition onto respective opposite major surfaces of the sheet of balsawood; and
    (c) curing the curable resin composition by radiation to restrict the penetration by uncured resin into the balsawood vessels; wherein the resin composition is applied and cured so that the coating layer of cured resin composition unevenly fills the outermost ends of at least some of the vessels in the balsawood, thereby providing a depression in the coating layer of the cured resin composition, or only partly fills outermost ends of at least some of the vessels in the balsawood and thereby provides, at least in the vicinity of at least some of the vessels, a non-planar outer surface of the coating layer of the cured resin composition over the opposite major surfaces.

2. A method according to claim 1 wherein the coating layer of cured resin composition, apart from at the outermost ends of the vessels in the balsawood at which the surface includes a cavity or depression above the vessel, is substantially continuous and planar.

3. A method according to claim 1 wherein the curable resin composition applied in step (b) has a viscosity of from 1 to 50 Poise when applied to the balsawood surfaces.

4. A method according to claim 1 wherein the curable resin composition applied in step (b) has a coating weight for each coated balsawood surface of from 50 to 300 g/m$^2$.

5. A method according to claim 1 wherein the curable resin composition applied in step (b) forms a coating layer having an average thickness of from 20 to 600 microns.

6. A method according to claim 1 wherein the curable resin composition applied in step (b) comprises at least one polymerisable monomer and a curing agent for polymerising the at least one polymerisable monomer.

7. A method according to claim 1 wherein the curable resin composition applied in step (b) comprises at least one acrylate or methacrylate monomer.

8. A method according to claim 7 wherein the curable resin composition applied in step (b) further comprises at least one urethane acrylate monomer.

9. A method according to claim 1 wherein the curable resin composition applied in step (b) is solvent-free or comprises no more than 1 wt %, based on the weight of the curable resin composition, of a non-polymerisable solvent for any polymerizable monomers present in the curable resin composition.

10. A method according to claim 1 wherein the curable resin composition applied in step (b) is substantially free of particulate fillers.

11. A method according to claim 1 wherein the curable resin composition applied in step (b) is heated above the ambient temperature to give an application viscosity of 1 to 50 Poise when applied to the balsawood surface.

12. A method according to claim 1 wherein the resin composition is applied and cured so that the cured resin composition extends downwardly into vessels of the balsawood to an average depth of from 250 to 2500 microns.

13. A method according to claim 1 wherein the coating step (b) is carried out using a roller.

14. A method according to claim 1 wherein the curing step (c) is carried out by ultraviolet, thermal or electron beam radiation or other electromagnetic radiation.

15. A method according to claim 1 wherein the curing step (c) is carried out on a given area of the coating layer within a period of from 2 to 45 seconds after coating of that area in step (b).

16. A method according to claim 1 wherein the coating step (b) and the curing step (c) are carried out by the step of (d) transporting the sheet successively through a coating station and a radiation curing station at a velocity of from 1 to 30 meters/minute.

17. A method according to claim 16 further comprising the step (e) of adjusting the velocity of the sheet transported successively through the coating station and the radiation curing station, and/or a distance between the coating station and the radiation curing station, in response to comparison of a measured penetration depth against a target penetration depth of the resin composition into a major surface of the sheet of balsawood.

18. A method of manufacturing a core for a composite material sandwich panel, the method comprising the steps of:
(a) providing a sheet of balsawood with opposite major surfaces, with vessels and axial parenchyma cells of the balsawood extending between the opposite major surfaces in a thickness direction of the sheet;
(b) coating a layer of a curable resin composition onto respective opposite major surfaces of the sheet of balsawood; and
(c) curing the curable resin composition by radiation, wherein the curable resin composition applied in step (b) has a viscosity of from 1 to 50 Poise when applied to the balsawood surfaces and a coating weight for each coated balsawood surface of from 50 to 300 g/m².

19. A method according to claim 18 wherein the curable resin composition applied in step (b) has a viscosity of from 2 to 20 Poise when applied to the balsawood surfaces.

20. A method according to claim 18 wherein the curable resin composition applied in step (b) has a coating weight for each coated balsawood surface of from 75 to 160 g/m².

21. A method according to claim 18 wherein the curable resin composition applied in step (b) forms a coating layer having an average thickness of from 20 to 600 microns.

22. A method according to claim 18 wherein the curable resin composition applied in step (b) is heated above the ambient temperature to give an application viscosity of 1 to 50 Poise-when applied to the balsawood surface.

23. A method according to claim 18 wherein the curable resin composition applied in step (b) comprises at least one polymerisable monomer and a curing agent for polymerising the at least one polymerisable monomer.

24. A method according to claim 18 wherein the curable resin composition applied in step (b) comprises at least one acrylate or methacrylate monomer.

25. A method according to claim 24 wherein the curable resin composition applied in step (b) further comprises at least one urethane acrylate monomer.

26. A method according to claim 18 wherein the curable resin composition applied in step (b) is solvent-free or comprises no more than 1 wt %, based on the weight of the curable resin composition, of a non-polymerisable solvent for any polymerizable monomers present in the curable resin composition.

27. A method according to claim 18 wherein the curable resin composition applied in step (b) is substantially free of particulate fillers.

28. A method according to claim 18 wherein the resin composition is applied and cured so that the cured resin composition extends downwardly into vessels of the balsawood to an average depth of from 250 to 2500 microns.

29. A method according to claim 18 wherein the coating step (b) is carried out using a roller.

30. A method according to claim 18 wherein the curing step (c) is carried out by ultraviolet, thermal or electron beam radiation or other electromagnetic radiation.

31. A method according to claim 18 wherein the curing step (c) is carried out on a given area of the coating layer within a period of from 2 to 45 seconds after coating of that area in step (b).

32. A method according to claim 18 wherein the coating step (b) and the curing step (c) are carried out by the step of (d) transporting the sheet successively through a coating station and a radiation curing station at a velocity of from 1 to 30 meters/minute.

33. A method according to claim 32 further comprising the step (e) of adjusting the velocity of the sheet transported successively through the coating station and the radiation curing station, and/or a distance between the coating station and the radiation curing station, in response to comparison of a measured penetration depth against a target penetration depth of the resin composition into a major surface of the sheet of balsawood.

34. A core for a composite material sandwich panel, the core comprising a coated balsawood sheet produced by the method of claim 1.

35. A composite material sandwich panel comprising a core according to claim 34 sandwiched between opposed outer layers of fibre reinforced matrix resin material.

36. A composite material sandwich panel according to claim 35 wherein the outer layers of fibre reinforced matrix resin material comprise at least one of glass fibres and carbon fibres and a cured thermoset resin matrix, the cured thermoset resin being bonded to the coating layer.

37. A composite material sandwich panel according to claim 36 wherein the cured thermoset resin has a climbing drum peel strength to the coated balsawood core of from 225 to 450 N/75 mm measured according to BS5350 Part C13.

38. A composite material sandwich panel made according to the method of claim 1, comprising opposed outer layers of fibre reinforced matrix resin material and a balsawood core sandwiched between the opposed outer layers, each outer layer of fibre reinforced matrix resin material comprising at least one of glass fibres and carbon fibres and a cured thermoset resin matrix, the balsawood core being coated with coating layer and the cured thermoset resin being bonded to the coating layer, wherein the cured thermoset resin has a climbing drum peel strength to the coated balsawood core of from 225 to 450 N/75 mm measured according to BS5350 Part C13.

39. A structural element incorporating the composite material sandwich panel of claim 35.

40. A wind turbine blade, or a marine component or craft, incorporating a structural element according to claim 39.

* * * * *